(12) United States Patent
Walker

(10) Patent No.: US 11,534,966 B2
(45) Date of Patent: Dec. 27, 2022

(54) METHODOLOGIES TO RAPIDLY CURE AND COAT PARTS PRODUCED BY ADDITIVE MANUFACTURING

(71) Applicant: AZUL 3D, INC., Skokie, IL (US)

(72) Inventor: David Alan Walker, Evanston, IL (US)

(73) Assignee: AZUL 3D, INC., Skokie, IL (US)

( * ) Notice: Subject to any disclaimer, the term of this patent is extended or adjusted under 35 U.S.C. 154(b) by 50 days.

(21) Appl. No.: 16/844,790

(22) Filed: Apr. 9, 2020

(65) Prior Publication Data

US 2020/0324470 A1    Oct. 15, 2020

Related U.S. Application Data

(60) Provisional application No. 62/831,537, filed on Apr. 9, 2019.

(51) Int. Cl.
| | |
|---|---|
| *B29C 64/188* | (2017.01) |
| *B29C 64/35* | (2017.01) |
| *B33Y 10/00* | (2015.01) |
| *B33Y 40/20* | (2020.01) |

(52) U.S. Cl.
CPC ............ *B29C 64/188* (2017.08); *B29C 64/35* (2017.08); *B33Y 10/00* (2014.12); *B33Y 40/20* (2020.01)

(58) Field of Classification Search
CPC .............................. B29C 64/188; B29C 64/35
See application file for complete search history.

(56) References Cited

U.S. PATENT DOCUMENTS

| | | |
|---|---|---|
| 4,972,006 A | 11/1990 | Murphy et al. |
| 8,883,871 B2 | 11/2014 | Wilson et al. |
| 9,494,260 B2 | 11/2016 | Luo et al. |
| 2010/0322908 A1 | 12/2010 | Everland et al. |
| 2012/0070622 A1 | 3/2012 | Stocq |
| 2016/0288433 A1 | 10/2016 | Stephenson et al. |
| 2017/0022312 A1* | 1/2017 | Liu ...................... C09D 133/14 |
| 2017/0173872 A1 | 6/2017 | McCall et al. |

FOREIGN PATENT DOCUMENTS

TW         201707939 A     3/2017

OTHER PUBLICATIONS

English machine translation of TW 201707939, retrieved Jun. 2, 2020 by the ISA in PCT/US2020/27509 (Year: 2020).*
International Search Report and Written Opinion corresponding to PCT/US2020/27509 dated Jun. 6, 2020, 16 pages.

* cited by examiner

*Primary Examiner* — Timothy Kennedy
(74) *Attorney, Agent, or Firm* — Barnes & Thornburg LLP

(57) ABSTRACT

A process to cure and/or modify the surface of a three dimensional (3D) printed part comprising the steps of immersing a three dimensional (3D) printed part, containing reactive moieties, into a liquid bath at an elevated temperature to effect polymerization of the reactive moieties of the 3D printed part to provide a cured 3D printed part is described. The liquid bath can further contain reactive molecules that can react with the surface of the 3D printed part to provide a coating which alters the surface characteristics of the 3D printed part.

24 Claims, 1 Drawing Sheet

METHODOLOGIES TO RAPIDLY CURE AND COAT PARTS PRODUCED BY ADDITIVE MANUFACTURING

CROSS REFERENCE TO RELATED APPLICATIONS

This utility application claims the benefit of priority of U.S. Provisional Patent Application No. 62/831,537, filed on Apr. 9, 2019, entitled "METHODOLOGIES TO RAPIDLY CURE AND COAT PARTS PRODUCED BY ADDITIVE MANUFACTURING," the contents of which are hereby incorporated by reference in their entirety, including but not limited to those aspects related to three-dimensional printing, additive manufacturing.

FIELD OF THE DISCLOSURE

The disclosure relates generally to curing and/or modifying a surface of a three dimensional (3D) printed part.

BACKGROUND OF THE DISCLOSURE

Conventionally, the StereoLithographic Approach (SLA) for additive manufacturing presents unique capabilities and technical opportunities over competing technologies. This is because SLA can deliver high print-speeds, while generating objects from a library of robust materials.

However, the rapid construction of three dimensional (3D) parts using such approaches has certain disadvantages. One disadvantage of SLA is that the part is not completely cured by the time the printing process is completed. That is to say, the chemical reactions responsible for solidifying the liquid resins used as a raw-material input have not been reacted to 100% conversion. This can lead to "tackiness" of the 3D part and possible deformation of the 3D part since "curing" is not complete during the initial formation process. In this state, the part is often referred to as being 'green'—an analogy to pottery in which you have 'green' unfired parts, and parts after having been fired with vastly different properties.

Additionally, after the 3D part is formed from the SLA process, the 3D part must be washed multiple times with various solvents to remove any uncured material, degradation products and/or byproducts of the process that remain on the 3D part. The washing leads to expense, increased production time, as well as the inconvenient necessity of appropriate disposal of the wash solutions.

Several SLA printer manufactures have attempted to address these processing challenges using a post-washing station (e.g., Carbon's Smart Part Washer, FormLab's Form Wash station) which are aimed at automating and reducing the labor of this process. After this post-washing, the parts must be 'cured' in a light-box (FormLab's Form Cure station) or convective oven (Carbon does not currently have an independent product line and refers clients to third party light box and oven manufacturers).

Therefore, a need exists that overcomes one or more of the current disadvantages noted above.

BRIEF SUMMARY OF THE DISCLOSURE

The present disclosure surprisingly provides processes to prepare three dimensional printed ("3D") parts with a reduced need for washing of the part as well as providing a 3D part that is cured and/or has as surface that has been treated to provide surface modification of the 3D part.

For example, in one embodiment, a process to cure and/or modify the surface of a three dimensional (3D) printed part comprises the steps of immersing a 'green' three dimensional (3D) printed part containing reactive moieties into liquid bath at an elevated temperature to effect the degree of polymerization of the reactive moieties within the 3D printed part to provide a cured 3D printed part. In another embodiment, the liquid bath can contain molecules with reactive moieties which can react with the surface of the 3D printed part. For example, radical initiated polymerization, can occur between the reactive moiety of the 3D printed part and the reactive molecule. Generally, an initiator or other reactive group is present in and/or at the surface of the 3D printed part which is responsible for the additional curing process and the reactivity with the dispersed reactive molecules at the part's surface. The initiator can be a photoinitiator or thermal initiator. The initiation can come from a thermally activated catalyst. The initiation can come from a thermally cleavable group or the product of a decomposition mechanism. In some aspects, the remaining initiator in the bulk of the part and/or at the surface of the part can be referred to as residual initiator.

Thus, as an example, rapid curing of parts produced by 3D printing techniques which utilize either photo-initiated or thermally-initiated polymerization reactions are disclosed herein. The processes described herein help reduce surface tack (number of dangling bonds) of resultant 3D parts and can be used to add additional chemical coatings which modify the touch and/or feel of the final part.

Currently, most 3D printing technologies utilize extensive solvent washing to help minimize surface tack on 3D printed parts, followed by curing in a high-intensity light box, or long bake times in a thermal oven. The present embodiments reduce the need for as many solvent washes and enables higher throughput in processing 'green' (not fully cured/polymerized) 3D printed parts, while also enabling new coating applications (i.e. non-stick, paint adhesive promoters, promoters for electro-coating, etc.).

While multiple embodiments are disclosed, still other embodiments of the present disclosure will become apparent to those skilled in the art from the following detailed description. As will be apparent, the disclosure is capable of modifications in various obvious aspects, all without departing from the spirit and scope of the present disclosure. Accordingly, the detailed descriptions are to be regarded as illustrative in nature and not restrictive.

DETAILED DESCRIPTION

Figure 1:
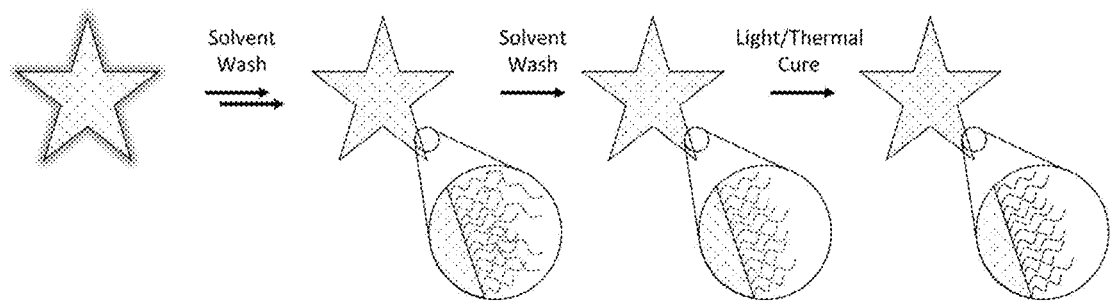
FIG. 1 depicts an example of traditional SLA post-processing.

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this disclosure belongs. All publications and patents specifically mentioned herein are incorporated by reference in their entirety for all purposes including describing and disclosing the chemicals, instruments, statistical analyses and methodologies which are reported in the publications which might be used in connection with the disclosure. All references cited in this specification are to be taken as indicative of the level of skill in the art. Nothing herein is to be construed as an admission that the present disclosure is not entitled to antedate such disclosure by virtue of prior disclosure.

The phrases "reactive moiety" and/or "reactive moieties" refer to polymeric resins that retain some unreacted portion(s) of the monomers, or remaining monomer itself, used to prepare the polymeric resin. That is, the polymeric resin that forms a 3D printed part is not fully cured to 100% of all potential reactive sites, such as acrylates, methacrylates, vinyl groups, olefinic groups, etc. Therefore, there is a percentage of reactive sites that remain within and/or at the surface of the polymeric resin that forms the 3D printed part. These "reactive moieties" (latent curable functionality(ies) within the polymeric resin) can further react under appropriate conditions (e.g., heat and or UV light) with a reactive moiety within the polymeric resin or another reactive molecule that also has a reactive site in the presence of an initiator present within or on the surface of the 3D printed part.

The phrases "reactive molecule" or "small reactive molecule" or "small molecule" is intended to refer to monomeric or oligomeric materials that can react with the surface of the 3D printed part that is partially or fully cured. Remaining initiator, as an example, found within or on the surface of the 3D printed part can impart a reaction between the surface of the 3D printed part and/or remaining reactive moieties present on the surface of the 3D printed part. There are other chemical mechanisms by which such a reaction might happen—but the key aspect being that there is a moiety within the bulk 3D printed part or on its surface where the "small reactive molecule" would be un-reactive in its absence. The reaction results in a coating on the surface of the 3D printed part and can impart unique physical characteristics to the surface, such as slipperiness, hydrophobicity, chemical resistance, hydrophilicity, biocompatibility, etc.

The term "initiator" is known in the art. Two types of initiators can be included in the polymeric resin formulations used in the processes to prepare the 3D printed parts described herein. The radical initiators include photo-initiators and thermal initiators. This term is used broadly to include other initiation steps and initiators, such as cationic initiators, photo-acid generators, thermally activated catalysts, or any other species which can be attributed to initiating further polymerization within the bulk of the 3D printed object or to adhere small molecules onto the printed object's surface. Initiator that remains in the bulk of a polymerized part and/or at the surface of the part can be referred to as "residual initiator."

Suitable photo-initiators include, but are not limited to, benzoin ethers (e.g., benzoin methyl ether or benzoin isopropyl ether) or substituted benzoin ethers (e.g., anisoin methyl ether). Other exemplary photo-initiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photo-initiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photo-initiators include, for example, 1-hydroxycyclohexyl phenyl ketone (commercially available under the trade designation IRGACURE 184), bis(2,4,6-trimethylbenzoyl)phenylphosphineoxide (commercially available under the trade designation IRGACURE 819), 2,4,6-trimethylbenzoylphenylphosphinic acid ethyl ester (commercially available under the trade designation IRGACURE TPO-L), 1-[4-(2-hydroxyethoxy)phenyl] -2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA). Other suitable photo-initiators (Type I and Type II) include those listed in the tables below.

| | | |
|---|---|---|
| Omnirad 1173 | 2-hydroxy-2-methyl-1-phenylpropanone | 7473-98-5 |
| Omnirad 184 | 1-hydroxycyclohexyl-phenyl ketone | 947-19-3 |
| Omnirad 127 | 2-hydroxy-1-(4-(4-(2-hydroxy-2-methylpropionyl)benzyl)phenyl)-2-methylpropan-1-one | 474510-57-1 |
| Omnirad 2959 | 1-[4-(2-hydroxyethoxy)-phenyl-2-hydroxy-methylpropanone | 106797-53-9 |
| Omnirad 369 | 2-benzyl-2-(dimethylamino)-4'-morpholinobutyrophenone | 119313-12-1 |
| Omnirad 379 | 2-dimethylamino-2-(4-ethyl-benzyl)-1-(4-morpholin-4-yl-phenyl)-butan-1-one | 119344-86-4 |
| Omnirad 907 | 2-methyl-1-[4-(methylthiolphenyl]-2-morpholinopropan-1-one | 71868-10-5 |
| Omnirad 4265 | Omnirad-TPO (50% wt) and Omnirad-1173 (50% wt) | 75980-60-8 + 7473-98-5 |
| Omnirad 1000 | Omnirad 1173 (80% wt) and Omnirad 184 (20% wt) | 7473-98-5 + 947-19-3 |

-continued

| | | |
|---|---|---|
| Omnirad BDK | 2,2-dimethoxy-2-phenylacetophenone | 24650-42-8 |
| Omnirad 403 | Bis(26-dimethoxybenzoyl)-2,4,4-trimethylpentylphosphine oxide | 145052-34-2 |
| Omnirad 1700 | Omnirad 403 (25% wt) and Omnirad-1173 (75% wt) | 145052-34-2 + 7473-98-5 |
| Omnirad 1870 | Omnirad 403 (70% wt) and Omnirad-184 (30% wt) | 145052-34-2 + 947-19-3 |
| Omnirad TPO | 2,4,6-trimethylbenzoyl-diphenyl phosphine oxide | 75980-60-8 |
| Omnirad TPO - L | Ethyl(2,4,6-trimethylbenzoyl)-phenyl phosphinate | 84434-11-7 |
| Omnirad 819 | Bis(2,4,6-trimethylbenzoyl)phenylphosphine oxide | 162881-26-7 |
| Omnirad 754 | Blend of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester | |
| Esacure KIP 150 | Oligomeric alpha hydroxy ketone 100% | 163702-01-0 |
| Esacure KIP 100 F | Oligomeric alpha hydroxy ketone (70% wt) and 2-hydroxy-2-methylpropiophenone (30% wt) | 163702-01-0 + 7473-98-5 |
| Esacure KIP 75 LT | Oligomeric alpha hydroxy ketone (75% wt) and tripropylene glycol diacrylate (25% wt) | 163702-01-0 + 42978-66-5 |
| Omnirad BP Flakes | Benzophenone | 119-61-9 |
| Omnirad 4MBZ Flakes | 4-methyl benzophenone | 134-84-9 |
| Omnirad 4PBZ | 4-phenyl benzophenone | 2128-93-0 |
| Omnirad OMBB | Methyl-o-benzoylbenzoate | 606-28-0 |
| Omnirad BMS | 4-(4methylphenylthio)benzophenone | 83846-85-9 |
| Omnirad 500 | Omnirad BP (50% wt) and Omnirad 184 (50% wt) | 119-61-9 + 947-19-3 |
| Esacure TZM | Liquid mixture of benzophenone (50%) and 4-methylbenzophenone (50%) | 119-61-9 + 134-84-9 |
| Esacure TZT | Liquid eutectic mixture of 2-4-6 trimethylbenzophenone and 4 methylbenzophenone | 954-16-5 + 134-84-9 |

| Sigma Catalogue # | Chemical |
|---|---|
| A1,070-1 | Acetophenone, |
| A8,840-9 | Anisoin, |
| A9,000-4 | Anthraquinone, |
| 12,324-2 | Anthraquinone-2-sulfonic acid, sodium salt monohydrate, |
| 11,931-8 | (Benzene) tricarbonylchromium, |
| B515-1 | Benzil, |
| 39,939-6 | Benzoin, |
| 17,200-6 | Benzoin ethyl ether |
| 19,578-2 | Benzoin isobutyl ether |
| B870-3 | Benzoin methyl ether |
| B930-0 | Benzophenone, |
| 40,562-0 | Benzophenone/1-Hydroxycyclohexyl phenyl |
| 26,246-3 | 3,3',4,4'-Benzophenonetetracarboxylic |
| B1,260-1 | 4-Benzoylbiphenyl, |
| 40,564-7 | 2-Benzyl-2-(dimethylamino)-4'-morpholinobutyrophenone, |
| 16,032-6 | 4,4'-Bis(diethylamino)benzophenone, |
| 14,783-4 | 4,4'-Bis(dimethylamino)benzophenone, |
| 12,489-3 | Camphorquinone, |
| C7,240-4 | 2-Chlorothioxanthen-9-one, |
| 40,807-7 | (Cumene)cyclopentadienyliron(II) hexafluorophosphate, |
| D3,173-7 | Dibenzosuberenone, |
| 22,710-2 | 2,2-Diethoxyacetophenone, |
| D11,050-7 | 4,4'-Dihydroxybenzophenone, |
| 19,611-8 | 2,2-Dimethoxy-2-phenylacetophenone, |
| 14,934-9 | 4-(Dimethylamino)benzophenone, |
| 14,670-6 | 4,4'-Dimethylbenzil, |
| D14,966-7 | 2,5-Dimethylbenzophenone, tech., |
| D14,967-5 | 3,4-Dimethylbenzophenone, |
| 40,566-3 | Diphenyl(2,4,6-trimethylbenzoyl)phosphine oxide/2-Hydroxy-2-methylpropiophenone, |
| 27,571-9 | 4'-Ethoxyacetophenone, |
| E1,220-6 | 2-Ethylanthraquinone, |
| F40-8 | Ferrocene, |
| 32,810-3 | 3'-Hydroxyacetophenone, |
| 27,856-4 | 4'-Hydroxyacetophenone, |
| 22,043-4 | 3 -Hydroxybenzophenone, |

-continued

| | |
|---|---|
| H2,020-2 | 4-Hydroxybenzophenone, |
| 40,561-2 | 1-Hydroxycyclohexyl phenyl ketone, |
| 40,565-5 | 2-Hydroxy-2-methylpropiophenone, |
| 15,753-8 | 2-Methylbenzophenone, |
| 19,805-6 | 3-Methylbenzophenone, |
| M3,050-7 | Methybenzoylformate, |
| 40563-9 | 2-Methyl-4'-(methylthio)-2-morpholinopropio-phenone, |
| 15,650-7 | Phenanthrenequinone, |
| 29,074-2 | 4'-Phenoxyacetophenone, |
| T3,400-2 | Thioxanthen-9-one, |
| 40,722-4 | Triarylsulfonium hexafluoroantimonate salts, mixed, 50% in propylene carbonate |
| 40,721-6 | Triarylsulfonium hexafluorophosphate salts, mixed, 50% in propylene carbonate |

Chemical initiators include, for example, those noted in the table below.

Chemical Initiators

| | | |
|---|---|---|
| Omnirad DETX | 2,4-diethylthioxanthone | 82799-44-8 |
| Omnirad ITχ | 2-isopropyl thioxanthone | 5495-84-1 |
| Omnirad MBF | Methylbenzoylformate | 15206-55-0 |
| Omnirad EMK | 4,4'bis(diethylamino) benzophenone | 90-93-7 |
| Omnipol 910 | Piparazino based aminoalkylphenone type I photoinitiator | 886463-10-1 |
| Omnipol 9210 | Piparazino based aminoalkylphenone type I photoinitiator diluted in PPTTA | 886463-10-1 + 51728-26-8 |
| Omnipol 2702 | Polymeric benzophenone derivative type II photoinitiator | 1246194-73-9 |
| Omnipol BP | Di-ester of carboxymethoxy-benzophenone and polytetramethyleneglycol 250 type II photoinitiator | 515136-48-8 |
| Omnipol TX | Di-ester of carboxymethoxy thioxanthone and polytetramethyleneglycol 250 Type II photoinitiator | 813452-37-8 |
| Omnipol BL 728 | Low viscosity blend based on Omnipol TX type II photoinitiator blend | 74512-23-5 |
| Omnirad 127 | 2-hydroxy-1-(4-(4-(2-hydroxy-2-methylpropionyl)benzyl)phenyl)-2-methylpropan-1-one | 474510-57-1 |
| Omnirad 819 | Bis(2,4,6-trimethylbenzoyl)phenylphosphine oxide | 162881-26-7 |
| Omnirad 819 DW | Omnirad 819 DW is a dispersion of 45% bis-acylphosphine oxide in water | |
| Esacure 1001 M | Difunctional ketosulphone type II photointiator | 272460-97-6 |
| Esacure ONE | Difunctional oligomeric alpha hydroxy ketone type I photoinitiator | 163702-01-0 |
| Esacure KIP 160 | Difunctional alpha hydroxy ketone type I photoinitiator | 71868-15-0 |
| Genocure BDK | Benzildimethylketal | |
| Genocure BDMM | 2-Benzyl-2-dimethylamino-1-(4-morpholinophenyl)-butanone-1 | |
| Genocure BP | Benzophenone | |
| Genocure CPK | 1-Hydroxycyclohexylphenyl ketone | |

-continued

| Chemical Initiators | |
|---|---|
| Genocure DEAP | 2,2 Diethoxyacetophenone |
| Genocure DETX | 2,4 Diethylthioxanthone |
| Genocure DMHA | Dimethylhydroxyacetophenone |
| Genocure EMK | 4,4-Bis (diethylamino) benzophenone |
| Genocure ITX | Isopropylthioxanthone |
| Genocure LBC | 1-Hydroxycyclohexylphenyl ketone and Benzophenone |
| Genocure LBP | 4-Methylbenzophenone and Benzophenone |
| Genocure LTD | Liquid Photoinitiatorblend |
| Genocure LTM | |
| Genocure MBB | Methyl-o-benzoyl-benzoate |
| Genocure MBF | Methylbenzoylformate |
| Genocure PBZ | 4-Phenylbenzophenone |
| Genocure PMP | 2-Methyl-1-(4-methylthiophenyl)-2-morpholinpropan-1-one |
| Genocure TPO | 2,4,6-Trimethylbenzoyldiphenyl phosphine oxide |
| Genocure TPO-L | Ethyl(2,4,6-trimethylbenzoyl) phenylphosphinate |
| Genopol AB-2 | Polymeric Aminobenzoate Derivative |
| Genopol BP-2 | Polymeric Benzophenone Derivative |
| Genopol TX-2 | Polymeric Thioxanthone Derivative |

The catalysts noted herein are employed in a concentration ranging from about 0.05 to about 5.0%, from about 0.1 to about 2.0%, or from about 0.2 to about 1.0% (by weight relative to the composition weight).

Suitable thermal initiators include, but are not limited to, are suitable peroxides ("ROOR"), wherein R is H or an organic moiety. Peroxide catalysts include, for example, hydrogen peroxide and any organic peroxide, such as, e.g., benzoyl peroxide, methyl ethyl ketone peroxide, 1-butyl hydroperoxide and derivatives and combinations thereof. The peroxide catalysts are generally employed in a concentration ranging from about 0.1 to about 5%, or greater of the total weight of the composition. More particularly, the peroxide catalysts are employed in a concentration ranging from about 0.05 to about 5.0%, from about 0.1 to about 2.0%, or from about 0.2 to about 1.0% (by weight relative to the composition weight). For example, methyl ethyl ketone peroxide (0.1% solution in toluene) can be utilized.

Suitable thermal initiators also include various azo compound such as those commercially available under the trade designation VAZO from E. I. DuPont de Nemours Co. (Wilmington, Del., USA), including VAZO 67, which is 2,2'-azobis(2-methylbutane nitrile), VAZO 64, which is 2,2'-azobis(isobutyronitrile), VAZO 52, which is (2,2'-azobis(2,4-dimethylpentanenitrile)), and VAZO 88, which is 1,1'-azobis(cyclohexanecarbonitrile); various peroxides such as benzoyl peroxide (BPO, CAS No. 94-36-0), cyclohexane peroxide, lauroyl peroxide, di-tert-amyl peroxide, tert-butyl peroxy benzoate, di-cumyl peroxide, and peroxides commercially available from Atofina Chemicals, Inc. (Philadelphia, Pa.) under the trade designation LUPEROX (e.g., LUPEROX 101, which is 2,5-bis(tert-butylperoxy)-2,5-di-methylhexane (CAS No. 78-63-7), LUPEROX 130, which is 2,5-dimethyl-2,5-di-(tert-butylperoxy)-3-hexyne) and LUPEROX 531, which is 1,1-di-(t-amylperoxy)cyclohexane (CAS No. 15677-10-4)); various hydroperoxides such as tert-amyl hydroperoxide and tert-butyl hydroperoxide; and mixtures thereof.

Additional thermal initiators include, but are not limited to, p-toluenesulfonic acid (CAS No. 104-15-4), dibutyltin dilaurate (CAS No. 77-58-7), n-butylaminopropyltrimethoxysilane (CAS No. 31024-56-3) and alkylamine zinc carboxylate (K-Kat 670).

Another example of a peroxide is urea peroxide, often supplied as a 1 percent by weight in solution.

Amine synergists/catalysts can also be utilized. The table below provide suitable examples of amine synergists/catalysts.

| | | |
|---|---|---|
| Omnirad EDB | Ethyl-4-(dimethylamino) benzoate | 10287-53-3 |
| Omnirad EHA | 2-ethylhexyl-4-dimethylaminobenzoate | 21245-02-3 |
| Omnipol ASA | Poly(ethylene glycol) bis(p-dimethylaminobenzoate) | 71512-90-8 |
| Esacure A 198 | Difunctional amine synergist | 925246-00-0 |
| Photomer 4068 | Acrylated amine synergist | |
| Photomer 4250 | Acrylated amine synergist | |
| Photomer 4771 | Acrylated amine synergist | |
| Photomer 4775 | Acrylated amine synergist | |
| Photomer 4967 | Acrylated amine synergist | |
| Photomer 5006 | Acrylated amine synergist | |
| Genocure EHA | 2-Ethylhexyl-4-dimethylaminobenzoate | |
| Genocure HPD | Ethyl-4-dimethylaminobenzoate | |
| Genocure MDEA | N-Methyldiethanolamine | |

Cationic photo-initiators can also be utilized in the processes described herein. Suitable examples are noted in the table below.

| | | |
|---|---|---|
| Omnicat 250 | 75% solution of Iodonium, (4-methylphenyl) [4-(2-methylpropyl)phenyl]-, hexafluorophosphate(1-) in propylene carbonate | 344562-80-7 + 108-32-7 |
| Omnicat 270 | High-molecular-weight sulfonium hexafluro phosphate | 953084-13-4 |
| Omnicat 320 | Mixed triarylsulphonium hexaantimonate salts in 50% propylene carbonate | 159120-95-3 + 108-32-7 |
| Omnicat 432 | Mixed triarylsulfonium hexafluorophosphate salts (45%) in propylene carbonate (55%) | 68156-13-8 + 74227-35-3 + 108-32-7 |
| Omnicat 440 | 4,4'-dimethyl-diphenyl iodonium hexafluorophosphate | 60565-88-0 |
| Omnicat 445 | Mixture of Omnicat 440 (50%) in Oxetane (50%) | 60565-88-0 + 3047-32-3 |
| Omnicat BL 550 | Blend of Omnicat 550 (20%) in propylene carbonate (25%) and Omnilane OC 2005 (55%) | 591773-92-1 + 108-32-7 + 2386-87-0 |
| Esacure 1187 | Liquid solution of modified sulfonium salt hexaflu orophosphate diluted in propylene carbonate | 492466-56-5 |

In another embodiment, photo-acid generators can be used as the initiator. Suitable examples are shown in the table below.

| | | |
|---|---|---|
| Omnirad 1173 | 2-hydroxy-2-methyl-1-phenylpropanone | 7473-98-5 |
| Omnirad ITX | 2-isopropyl thioxanthone | 5495-84-1 |
| Omnirad CPTX | 1-chloro-4-propoxythioxanthone | 142770-42-1 |

Surface adhesion promotors can also be used in the processes described herein. Suitable example of surface adhesion promoters include those in the table below.

| | |
|---|---|
| Photomer 2203 | Acid functional methacrylate |
| Photomer 2204 | Acid functional methacrylate |
| Photomer 4046 | Acid functional acrylate |
| Photomer 4173 | Acid functional acrylate |
| Photomer 4703 | Acid functional acrylate |
| Photomer 5028 | Chlorinated polyester 40% of GPTA |
| Photomer 5042 | Chlorinated polyester 40% of TMPTA |
| Photomer 5437 | Polyester tetraacrylate |
| Photomer 9502 | Acrylic resin diluted in TPGDA and HDDA |
| Genorad 40 | Adhesion Promoter |
| Genorad 41 | Adhesion Promoter |

The present disclosure provides embodiments to prepare three dimensional printed ("3D") parts with a reduced need for washing of the part as well as providing a 3D part that is cured and/or has as surface that has been treated to provide surface modification of the 3D part.

For example, in one embodiment, a process to cure and/or modify the surface of a three dimensional (3D) printed part comprises the steps of immersing a three dimensional (3D) printed part containing reactive moieties into liquid bath in the presence of a residual initiator at an elevated temperature to effect polymerization of the reactive moieties of the 3D printed part to provide a cured 3D printed part. In another embodiment, the liquid bath can contain a reactive molecule. The reactive molecule includes functionality that can react with the bulk and/or surface of the 3D printed part that includes reactive moieties. For example, radical initiated polymerization, can occur between the reactive moiety of the 3D printed part and the reactive molecule. Generally, an initiator, e.g., residual initiator, is present in the bulk of and/or at the surface of the 3D printed part. The initiator can be a photo-initiator or thermal initiator.

Rather than curing a 'green' part (a not fully cured/polymerized part, i.e., pushing the chemical reaction to 100% completion after printing) with a light-box or a convection oven, the present embodiments utilize a hot liquid bath to cure the 3D printed parts. The bath provides advantages over a traditional-light box or thermal oven.

Not to be limited by theory, one advantage provided by the present embodiments is a result that the liquid and polymeric resin are immiscible (low-surface energy, high contact-angle for the liquid on the part surface). Dangling oligomeric chains on the surface of the solidified 3D part collapse and are driven back towards the part surface as opposed to extending out into the liquid. In other words, the dangling polymer chains are in a theta-solvent condition (pushed beyond the theta point and are in a poor solvent form) in which they are insoluble and contract/coil back towards the part surface rather than extend into the liquid. As the temperature is increased for this liquid, the dangling oligomers continue to react and link back to the part's bulk surface, preventing the extension of the dangling oligomer when the poor solvent/oil is removed. By the final reaction occurring with the polymer strands in a collapsed configuration, the surface tack of the part is substantially reduced for the end use application.

For example, a liquid that solvates the dangling polymer chains from the bulk surface and does not facilitate the collapse of the dangling polymer chains upon themselves is considered a good solvent. A liquid that causes the collapse of the dangling polymer chains at the bulk surface upon themselves is considered a poor solvent (i.e., nonsolvent). Combinations of solvent/poor solvents can be used to vary the percentage of the polymer chains which will collapse and reside at the part's bulk surface.

To further detail the processes described herein, FIG. 1 depicts an example of traditional SLA post-processing. First, the majority of residual photo-active resin (red haze) is removed by solvent washing. Multiple wash-stations are used in sequence to remove all trace amounts of non-bound reactive oligomers (red strands). Then, the object is cured using light or heat to convert the reactive groups to a non-reactive state (black strands). These strands do not necessarily bind to the surface of the bulk part, leaving a residual tackiness.

The phrases "solvent wash", "wash solvent", "solvent washing" or "washed with a solvent" refer to solvents used for the cleaning/removal of unreacted polymeric resin(s), degradation product(s), and/or byproducts left on the surface of the 3D printed part. Suitable solvents include, but are not limited to, isopropyl alcohol, acetone, propylene glycol, propylene glycol ethers, such as dipropylene glycol monomethyl ether (DPM) and tripropylene glycol monomethyl ether (TPM), methanol, decafluoropentane, fluoroethers, hexanes, ethyl acetate, dichloromethane, choroform and mixtures thereof.

Typically, current processes to produce 3D printed figures require 3 washes or from 2 to about 5 washes to remove residual polymeric resin(s) or byproducts or degradation products from the 3D printing process.

Some 3D printing companies "soak" the 3D printed part in a solvent for 15 to 30 minutes. This can be a disadvantage in that the part can swell with solvent and weaken.

In contrast, the present embodiments only require a single wash or two, thus saving on the use of solvent(s) as well as time required to prepare the surface of the 3D printed part for additional modification(s). The present processes described herein do not require that the 3D printed part be "soaked" for a period of time (15-30 minutes). This eliminates the possibility of swelling of the 3D printed part as well as reducing manufacturing time.

A second advantage presented by the current embodiments is that the part can be coated or derivatized with a layer of small reactive molecules which bind to the surface. The reactive molecule(s) can be added to the liquid bath and are driven to the part-liquid interface via surface energy (i.e. they act as a surfactant). Reactive groups, such as vinyl groups, acrylate or methacrylate groups, olefinic groups, or thiols on these small molecules can then react with the surface of the 3D printed part and chemically link to the surface. These small molecules can be used to alter important properties, such as chemical resistance, hydrophobicity, hydrophilicity, biocompatibility or surface touch. Additionally, chemical promoters can be linked onto the part to help adhesion of a secondary coating material (e.g., promoter for auto body paint adhesion, promoter for metal deposition via electro-less metal plating). Importantly, the initiating chemical reaction is only within the bulk of or on the surface of the 3D printed part, so that these small reactive molecules do not react with each other and polymerize when dispersed in the bulk liquid phase. They can only react when in close proximity to the 3D printed part which includes the requisite initiator.

Figure 2:
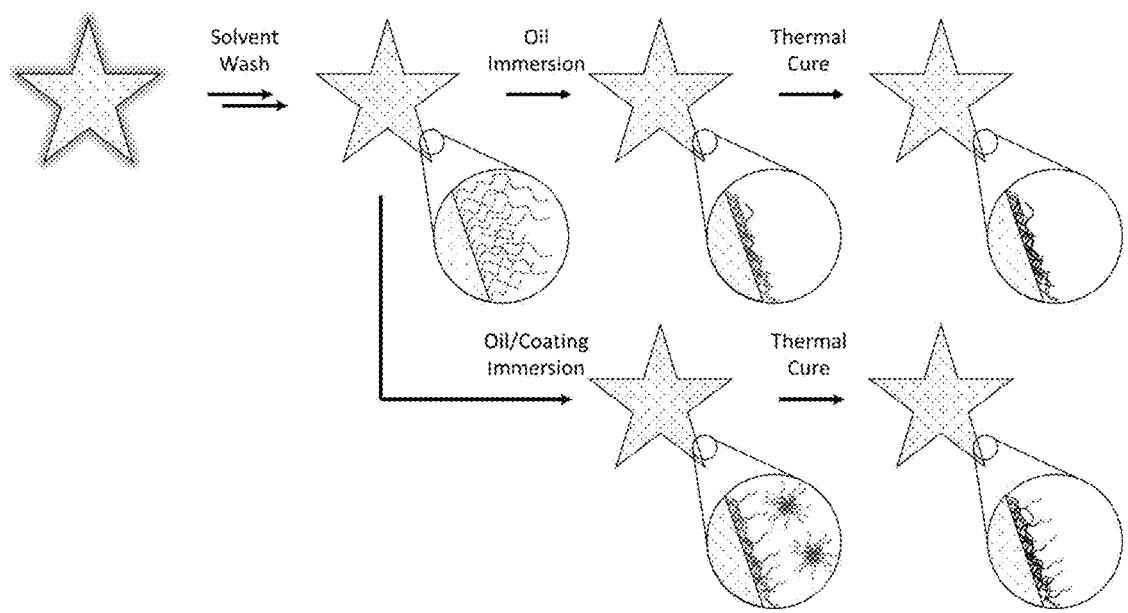
FIG. 2 depicts an example of the new SLA post-processing approach disclosed herein.

FIG. 2 depicts an example of the present SLA post-processing approach disclosed herein. First, the majority of residual photo-active resin (red haze) is removed by solvent washing. Limiting the wash step to a single bath, causes residual strands to remain. Any residual reactive oligomers (red strands) that are not removed in these wash steps are collapsed onto the surface of the part by immersion in an immiscible liquid. Then, the object is cured using light or heat to bind these oligomers to the bulk surface while in a collapsed state to a non-reactive state (black strands). Alternatively, small reactive molecules can be added to the liquid (blue-red strands) to coat the surface of the object. When heated, these molecules react with the still reactive oligomers on the surface of the part and create a coating (pendant blue chains). Remaining residual initiator molecules in the bulk and/or at the surface of the cured object may help in the reaction.

One example of a family of reactive hydrophobic molecules (a reactive small molecule) are (meth)acrylate-containing siloxane monomers. The (meth)acrylate-containing siloxane monomer may be mono-functional, bi-functional, or comprise a combination of mono- and bi-functional acrylate-containing siloxane monomers. In examples where the acrylate-containing siloxane monomer consists of one or more mono-functional acrylate-containing siloxane monomers (i.e. it does not contain any multi-functional acrylate-containing siloxane monomers), the polymerizable composition will typically further comprise an acrylate-containing cross-linking agent, described further below. In a specific example, the acrylate-containing siloxane monomer has one or more polymerizable methacrylate groups. Various non-limiting examples of suitable (meth)acrylate-containing siloxane monomers include 3-[tris(trimethylsiloxy)silyl]propyl methacrylate ("TRIS"), 3-methacryloxy-2-hydroxypropyloxy)propylbis(trimethylsiloxy)methylsilane ("SiGMA"), methyldi(trimethylsiloxy)sylylpropylglycerolethyl methacrylate ("SiGEMA"), and monomethacryloxypropyl functional polydimethylsiloxanes such as MCR-M07 and MCS-M11, all available from Gelest (Morrisville, Pa., USA).

Examples of hydrophobic vinyl-containing monomers (reactive small molecules) include, but are not limited to, tetrafluoroethylene (TFE), hexafluoropropylene, vinylidine fluoride, trifluoroethylene, chlorotrifluoroethylene, perfluoroalkylvinyl ether, and mixtures thereof Examples of hydrophobic (meth)acrylate-containing monomers (reactive small molecules) include, but are not limited to fluorinated alkyl (meth)acrylates and fluorinated (meth)acrylate siloxanes, such as monomethacryloxypropyl terminated poly(dimethylsiloxane).

Examples of hydrophilic vinyl-containing monomers include hydrophilic monomers having a single vinyl ether, or vinyl ester, or allyl ester, or vinyl amide polymerizable group. Exemplary hydrophilic vinyl-containing monomers include N-vinyl-N-methyl acetamide (VMA), N-vinyl pyrrolidone (NVP), 1,4-butanediol vinyl ether (BVE), ethylene glycol vinyl ether (EGVE), diethylene glycol vinyl ether (DEGVE), and combinations thereof.

Examples of hydrophilic (meth)acrylate-containing monomers include, for example, (meth)acrylic acid, hydroxyethyl (meth)acrylate, hydroxypropyl meth(acrylate) and mixtures thereof.

A third advantage is the speed at which the polymerization reaction happening within the 'green' printed part can be pushed to completion. As noted above, usually a light-box or convective oven is used to raise the temperature of the part. This can potentially be the slowest part of the production process and limit throughput capacity. By using a liquid bath as described herein, the transfer of thermal energy into the part to raise the internal temperature is much more rapid. This enables curing of the 3D printed parts at a faster rate than conventional techniques.

The liquid baths utilized can be any commercial solvent that can be heated over a range of temperatures. Organic oils, silicone oils, fluorinated oils, aqueous based oil baths, e.g., water, water/glycols, water/DMSO, DMSO and the like can function for the liquid bath.

Fluoro liquids can include, but are not limited to, fluorinated oils. Fluorinated oils generally include liquid perfluorinated organic compounds. Examples of fluorinated oils include perfluoro-n-alkanes, perfluoropolyethers, perfluoralkylethers, co-polymers of substantially fluorinated molecules, and combinations of the foregoing.

Organic liquids can include, but are not limited to, organic oils, organic solvents, including but not limited to chlorinated solvents (e.g., dichloromethane, dichloroethane and chloroform), and organic liquids immiscible with aqueous systems. Organic oils include neutral, nonpolar organic compounds that are viscous liquids at ambient temperatures and are both hydrophobic and lipophilic. Examples of organic oils include, but are not limited to higher density hydrocarbon liquids.

Silicone oils are liquid polymerized siloxanes with organic side chains. Examples of silicone oils include polydimethylsiloxane (PDMS), simethicone, and cyclosiloxanes. For example, silicone oils are utilized for oil baths. The silicone oil is generally a polydimethylosiloxane (PDMS) and can have a viscosity range (at ambient temperatures) of from about 0.65 cSt to about 2,500,000 cSt.

Suitable PDMS oils, include those available from Gelest, Inc. such as DMS-T00 (0.65 cSt), DMS-T01 (1.0 cSt), DMS-T01.5 (1.5 cSt), DMS-T02 (2.0 cSt), DMS-T03 (3.0 cSt), DMS-T05 (5.0 cSt), DMS-T07 (7.0 cSt), DMS-T11 (10 cSt), DMS-T12 (20 cSt), DMS-T15 (50 cSt), DMS-T21 (100 cSt), DMS-T22 (200 cSt), DMS-T23 (350 cSt), DMS-T25 (500 cSt), DMS-T31 (1000 cSt), DMS-T35 (5,000 cSt), DMS-T41 (10,000 cSt), DMS-T41.2 (12,500 cSt), DMS-T43 (30,000 cSt), DMS-T46 (60,000 cSt), DMS-T51 (100,000 cSt), DMS-T53 (300,000 cSt), DMS-T56 (600,000 cSt), DMS-T61 (1,000,000 cSt), DMS-T63 (2,500,000 cSt) and DMS-T72 (20,000,000 cSt).

A fourth advantage of the liquid-bath system relates to the heat-deflection of the material which was used to print the 3D part. For many materials in the 3D printing space, when heated, they lose their structural strength and can bow/deflect under their own weight. The temperature at which a material substantially alters its material properties in this way is known as the "heat deflection temperature". Both ovens and the liquid bath processes described herein can be used to bring a material close to its heat deflection temperature. One difference in an liquid bath is that the buoyant force acting upon the object causes the 3D printed object to experience less gravitational force when submerged in the liquid. In short, when the object is free-standing in an oven it can potentially sag under its own weight and be permanently deformed. In the embodiments described herein, the effective weight of the object is substantially less due to the buoyant force of the liquid, thereby limiting or eliminating the degree of deformation.

Selection of the solvent in the liquid bath can be attenuated so that the density of the liquid is equivalent or substantially equivalent to the density of the object. By selecting an appropriate liquid for the bath, stresses associated with the part in a typical curing environment, e.g., gravity, are reduced or eliminated so that object is essentially weightless in the curing bath. Such attenuation limits or eliminates the degree of deformation often associated with curing of a green object. Non-limiting examples of 3D printing resins can include density ranging from about 0.8 to about 1.3 g/mL; suitable oils can range from about 0.7 to about 2.4 g/mL, and may include by non-limiting example, a density ratio of resin to oil within the range of about 0.5 to about 1.5. In alternative embodiments, the green part/object can be coated with an oil, without immersion into a bath, as described herein, and subjected to a traditional oven cure to decrease the surface tack. The oil coating, followed by a UV and/or thermal cure treatment, may act in a similar manner described above, in which the poor solvent layer causes a collapse of dangling surface polymer strands.

As used here, "polymerizable liquid" includes any small building blocks which combine to form a larger structure, for example, monomers/oligomers cross-linked through traditional polymer chemistry, small particulate/colloidal matter which binds together, metal ions that deposit to form a bulk metallic, or any other number of chemical to microscale building blocks. It should be understood that the polymerizable liquids described herein can include various additives and that the polymerizable liquid once polymerized provides a green object/composition that can be further cured as detailed herein.

In embodiments described herein, the polymerizable liquid can include a monomer or oligomer, particularly photopolymerizable and/or free radical polymerizable monomers and oligomers, and a suitable initiator such as a free radical initiator. Examples include, but are not limited to, acrylics, methacrylic s, acrylamides, styrenics, olefins, halogenated olefins, cyclic alkenes, maleic anhydride, alkenes, alkynes, carbon monoxide, functionalized oligomers, multifunctional cure site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968; CN 102715751; JP 2012210408.

In embodiments described herein, the polymerizable liquid comprises a monomer or oligomer selected from the group consisting of acrylics, methacrylics, urethanes, acrylesters, polyesters, cyanoesters, acrylamides, maleic anhydride, functionalized PEGS, dimethacrylate oligomer, or a combination thereof.

In other embodiments described herein, the polymerizable liquid comprises a monomer or oligomer selected from the group consisting of olefins, halogenated olefins, cyclic alkenes, alkenes, alkynes, and a combination thereof. In embodiments, the organic polymerizable liquid is selected from the group consisting of 1,6-hexanediol diacrylate (HDDA, pentaerythritol triacrylate, trimethylolpropane triacrylate (TMPTA), isobornyl acrylate (IBOA), tripropyleneglycol diacrylate (TPGDA), (hydroxyethyl)methacrylate (HEMA), and combinations thereof Acid catalyzed polymerizable liquids. Various embodiments, as noted above, provide a polymerizable liquid comprising a free radical polymerizable liquid, in other embodiments the polymerizable liquid comprises an acid catalyzed, or cationically polymerized, polymerizable liquid. In such embodiments the polymerizable liquid comprises monomers containing groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocyclic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also Photoacid Generator Selection Guide for the electronics industry and energy curable coatings (BASF 2010)

Base catalyzed polymerizable liquids. In some embodiments the polymerizable liquid comprises a base catalyzed polymerizable liquid. Suitable base catalyzed polymerizable liquids include, but are not limited to, malachite green carbinol base, that produce a hydroxide when irradiated with green light.

Hydrogels. In some embodiments, suitable polymerizable liquids include photocurable hydrogels like poly(ethylene glycols) (PEG) and gelatins. PEG hydrogels have been used to deliver a variety of biologicals, including Growth factors; however, a great challenge facing PEG hydrogels cross-linked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Silicone resins. A suitable polymerizable liquid includes silicones. Silicones can be photocurable, or solidified via a Michael reaction between a thiol and a vinyl residue using a radical photo-initiator. Suitable photo-initiators include, but are not limited to, phenylbis(2,4,6-trimethylbenzoyl) phosphine oxide, vinylmethoxysiloxane homopolymer, and (mercaptopropyl)methylsiloxane homopolymer.

Biodegradable resins. Biodegradable polymerizable liquids are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable polyurethanes. A particularly useful polymerizable liquid is a photocurable polyurethane. A photopolymerizable polyurethane composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

High performance resins. In some embodiments, polymerizable liquids include high performance resins. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present disclosure they further comprise a suitable photoinitiator such as benzophenone, anthraquinone, and fluoroenone initiators (including derivatives thereof), to initiate cross-linking on irradiation, as discussed further below.

Additional examplary resins. Particularly useful resins for polymerizable liquids, for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM140IV High Temperature Mold Material for use directly with vulcanized rubber in molding/casting applications. A particularly useful material for making tough and stiff parts includes EnvisionTEC's RC31 resin. A particularly useful resin for investment casting applications includes EnvisionTEC's Easy Cast EC500.

Sol-gel polymerizable liquids. In some embodiments, the polymerizable liquid may comprise a sol solution, or acid-catalyzed sol. Such solutions generally comprise a metal alkoxide including silicon and titanium alkoxides such as silicon tetraethoxide (tetraethyl orthosilicate; TEOS) in a suitable solvent. Products with a range of different properties can be so generated, from rubbery materials (e.g., using silane-terminated silicone rubber oligomers) to very rigid materials (glass using only TEOS), and properties in between using TEOS combinations with various silane-terminated oligomers. Additional ingredients such as dyes and dopants may be included in the sol solution as is known in the art, and post-polymerization firing steps may be include as is known in the art. See, e.g., U.S. Pat. Nos. 4,765,818; 7,709,597; 7,108,947; 8,242,299; 8,147,918; 7,368,514.

Additional resin ingredients. In some embodiments, the polymerization liquid comprises a particulate or colloidal matter capable of binding together. In other embodiments, the polymerization liquid comprises metal ions capable of depositing to form a bulk metallic. The polymerizable liquid resin or material can have solid particles suspended or dispersed therein. Any suitable solid particle can be used, depending upon the end product being fabricated. The particles can be metallic, organic/polymeric, inorganic, ceramic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can comprise an active agent, though these may also be provided dissolved solubilized in the liquid resin as discussed below. For example, magnetic or paramagnetic particles or nanoparticles can be employed.

The polymerizable liquid can have additional ingredients solubilized therein, including pigments, dyes, UV blockers (also known as UV inhibitors), active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

UV blockers/inhibitors/absorbers (also known as stabilizers, UVA's) dissipate the absorbed light energy from UV rays as heat by reversible intramolecular proton transfer. Because this methodology does not rely solely upon UV curing to cure the green part, UVA's can be included in the 3D printing resin formulation. Following printing, the methods described herein can allow for a full cure throughout the part. Utilizing a standard UV-only post-cure, the interior of the part could remain partly uncured and could exhibit differing mechanical properties than the surface of the part.

Suitable UV blockers include, but are not limited to benzophenones, benzotriazoles, aryl esters, oxanilides, acrylic esters, formamidine carbon black, hindered amines, nickel quenchers, phenolic antioxidants, metallic salts, zinc compounds, hydroxybenzophenones (e.g., 2-hydroxy-4-n-octoxy benzophenone), hydroxybenzotriazines, cyanoacrylates, benzoxazinones (e.g., 2,2'-(1,4-phenylene)bis(4H-3,1-benzoxazin-4-one, commercially available under the trade name CYASORB UV-3638 from Solvay), aryl salicylates, hydroxybenzotriazoles (e.g., 2-(2-hydroxy-5-methylphenyl) benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Solvay) or the like, or a combination comprising at least one of the foregoing UV stabilizers.

Additional examples of UV absorbers include, but are not limited to, benzotriazole UVAs (available, for example, under the trade designations "TINUVIN P 213," "TINUVIN P 234," "TINUVIN P 326," "TINUVIN P 327," "TINUVIN P 328," and "TINUVIN P 571" from BASF/Azelis); hydroxylphenyl triazines such as a mixture of 2-[4-[(2-Hydroxy-3-dodecyloxypropyl)oxy]-2-hydroxyphenyl]-4,6-bis(2,4-dimethylphenyl)-1,3,5-triazine and 2-[4-[(2-Hydroxy-3-tridecyloxypropyl)oxy]-2-hydroxyphenyl]-4,6-bis(2,4-dimethylphenyl)-1,3,5-triazine (available, for example, under the trade designations "TINUVIN 400" and "TINUVIN 405" and a mixture of bis (1, 2, 2, 6, 6-pentamethyl-4-piperidyl) sebacate (CAS No. 41556-26-7) and methyl 1, 2, 2, 6, 6-pentamethyl-4-piperidyl sebacate (CAS No. 82919-37-7), under the trade designation "TINUVIN 292" from BASF/Azelis.

Other suitable UVA's include, but are not limited to, 9-anthracenecarboxaldehyde (CAS No. 642-31-9), anthracene (CAS No. 120-12-7), benz[b]anthracene (CAS No. 92-24-0), coumarin 6 (CAS No. 38215-36-0), 9-cyanoanthracene (CAS No. 1210-12-4), 9-nitroanthracene (CAS No. 602-60-8), 2-aminoanthracene (CAS No. 613-13-8), 9, 10-diphenylanthracene (1499-10-10), 9, 10-di(1-napthyl)anthracene (CAS No. 269-27-1) and 1-methylnaphthalene (90-12-0).

Where used, the amount of the UVA in any particular composition can be from about greater than 0 to about 1 wt %, specifically 0.05 to 0.75 wt %, and specifically 0.1 to 0.5 wt %, based on the total weight of the composition.

The polymerizable liquid can further comprise one or more additional ingredients dispersed therein, including carbon nanotubes, carbon fiber, and glass filaments.

Polymerizable liquids carrying live cells. In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556,490; 6,602,975; 5,836,313.

The polymerizable liquids, which result in polymeric resins, can include one or more crosslinking agents. The phrase "polyethylenically unsaturated crosslinking agent or monomer" is recognized in the art and is intended to include those crosslinking agents that have two or more reactive double bonds present within the monomeric backbone. The degree of unsaturation provides the ability to polymerize with other crosslinking agent(s) as well as ethylenically unsaturated monomers to form a network of polymerized material. The "polyethylenically unsaturated crosslinking agent" can have multiple degrees of unsaturation associated with the agent, e.g., di, tri, tetra or penta.

A "cross-linking agent" is any compound having a molecular weight of less than about 2,000 with two or more ethylenically unsaturated groups. Thus, a cross-linking agent can react with functional groups on two or more polymer chains so as to bridge one polymer to another. An "acrylate-containing cross-linking agent" has at least two polymerizable acrylate functional groups, and no other type of polymerizable functional group. A "vinyl-containing cross-linking agent" has at least two polymerizable vinyl groups, and no other type of polymerizable functional group. Non-limiting examples of cross-linkers include such as trimethylolpropane trimethacrylate (TMPTMA), divinylbenzene, di-epoxies, tri-epoxies, tetra-epoxies, di-vinyl ethers, tri-vinyl ethers, tetra-vinyl ethers, and combinations thereof.

Suitable acrylate-containing crosslinking materials include, for example, 2-hydroxypropyl-1,3-diacrylate and dimethacrylate, 3-hydroxypropyl-1,2-diacrylate and dimethylacrylate, pentaerythritol diacrylate and dimethacrylate, polyethyleneglycol (400) diacrylate and dimethacrylate, glycerol dimethacrylate and diacrylate and pentaerythritol trimethacrylate and triacrylate, the reaction product of pyromellitic dianhydride with glycerol dimethacrylate (PMGDM), the addition product of 2-hydroxyethyl (meth) acrylate and pyromellitic dianhydride (PMDM), 2,2'-bis[4-(3-methacryloxy-2-hydroxy propoxy)-phenyl]propane (bis-GMA), lower alkylene glycol dimethacrylates such as triethylene glycol dimethacrylate (TEGDMA) or ethylene glycol dimethacrylate (EDGMA) and mixtures thereof.

Additional examples of (meth)acrylate-containing cross-linking agents that can be used in the polymerizable compositions disclosed herein, include, without limitation, lower alkylene glycol di(meth)acrylate, poly(lower alkylene) glycol di(meth)acrylate, lower alkylene di(meth)acrylate, trimethylolpropane tri(meth)acrylate, pentaerythritol tetra(meth) acrylate, bisphenol A di(meth)acrylate, methylenebis(meth) acrylamide, and 1,3-Bis(3-methacryloxypropyl) tetramethyldisiloxane.

Examples of vinyl-containing cross-linking agents that can be used in the polymerizable compositions disclosed herein include, without limitation, divinyl ethers, or divinyl sulfones, or triallyl isocyanurates, and any combination thereof. Exemplary divinyl ethers include diethyleneglycol divinyl ether, or triethyleneglycol divinyl, or 1,4-butanediol divinyl ether, or 1,4-cyclohexanedimethanol divinyl ether, or any combination thereof.

Additional examples of vinyl-containing cross-linking agents include divinyl ethers such as triethyleneglycol divinyl ether (TEGDVE) or diethyleneglycol divinyl ether (DEGDVE). and the acrylate-containing cross-linking agent is a lower alkylene glycol dimethacrylate such as triethylene glycol dimethacrylate (TEGDMA) or ethylene glycol dimethacrylate (EDGMA).

The present embodiments provide one or more of the following advantages. The liquid used in the liquid bath drives dangling strands of polymer of the 3D printed part which are not fully cured back towards the bulk surface of the plastic object, thereby reducing tack.

Reactive additives, reactive molecules, can be used in the liquid phase of the liquid bath that then are driven to the 3D printed part, and can chemically link/bind to the part's surface imparting additional properties.

The liquid bath is a faster conductor of heat, allowing for the temperature of the 3D printed part to be raised and fully cured much more quickly than with a traditional oven.

When a 3D printed part is submerged in liquid, its effective weight is lowered, thereby decreasing the likelihood of deformation when heated to higher temperature.

A liquid bath can be used in concert with a UV-light to drive further reaction/polymerization (i.e. light causes decomposition and heat accelerates the reaction propagation).

The following paragraphs enumerated consecutively from 1 through 23 provide for various aspects of the present disclosure. In one embodiment, in a first paragraph (1), the present disclosure provides a process to cure and/or modify the surface of a three dimensional (3D) printed part comprising the steps: immersing a three dimensional (3D) printed part containing reactive moieties and/or residual initiator and/or residual monomer into a liquid bath to effect polymerization of the reactive moieties and increase the degree of polymerization of the 3D printed part.

2. The process of paragraph 1, wherein the 3D printed part is washed with a solvent prior to submersion into the liquid bath.

3. The process of either paragraphs 1 or 2, wherein the liquid bath is at an elevated temperature below the heat deflection temperature of the 3D printed part.

4. The process of paragraph 3, wherein the liquid bath is heated to about 30° C. to about 300° C.

5. The process of any of paragraphs 1 through 4, wherein the 3D printed part is subjected to the liquid bath for a period of from about 1 minute to about 24 hours.

6. The process of any of paragraphs 1 through 5, wherein the liquid bath is a silicone oil bath, an aqueous glycol bath, a fluorinated polyether bath, an aqueous DMSO bath or a DMSO bath.

7. The process of paragraph 6, wherein the viscosity of the silicone oil is from about 0.6 cSt to about 20,000 cSt.

8. The process of any of paragraphs 1 through 7, further comprising a step of raising the temperature of the liquid bath from a beginning temperature to a final temperature.

9. The process of paragraph 8, wherein the beginning temperature is about room temperature or matches the initial temperature of the 3D printed part.

10. The process of paragraph 8, wherein the maximum temperature of the liquid bath reached is below the heat deflection temperature of the 3D printed part.

11. The process of any of paragraphs 8 through 10, wherein temperature of the liquid bath is increased in a linear fashion.

12. The process of any of paragraph 8 through 10, wherein the temperature of the liquid bath is increased in a non-linear ramp fashion.

13. The process of any of paragraphs 8 through 12, wherein the increase in temperature of the liquid bath is performed with periods of no increase in temperature over periods of time in a step wise fashion.

14. The process of any of paragraphs 1 through 13, wherein the 3D printed part with reactive moieties is formed from a thermo-set or a photo-set resin comprising an acrylic resin, a methacrylic resin, a silicone resin, a fluororesin, a styrene resin, a polyolefin resin, a thermoplastic elastomer, a polyoxyalkylene resin, a polyester resin, a polyvinyl chloride resin, a polycarbonate resin, a polyphenylene sulfide resin, a cellulose resin, a polyacetal resin, a melamine resin, a polyurethane resin or a polyamide resin.

15. The process of paragraph 14, further comprising a crosslinking agent.

16. The process of paragraph 15, wherein the crosslinking agent is a polyacrylate or polymethacrylate, an olefin, dithiol, diol, methoxysilane, ethoxysilane or a polysulfide.

17. The process of any of paragraphs 1 through 16, wherein the reactive moieties are in the bulk of the 3D printed part.

18. The process of any of paragraphs 1 through 16, wherein the reactive moieties are present on the surface of the 3D printed part.

19. The process of any of paragraphs 1 through 18, further comprising the step of adding a reactive molecule to the liquid bath.

20. The process of paragraph 19, wherein the reactive molecule reacts with the three dimensional (3D) printed part.

21. The process of either of paragraphs 19 or 20, wherein the reactive molecule is an acrylate, methacrylate, vinyl containing group, olefin, or a thiol containing group.

22. The process of any of paragraphs 19 or 20, wherein the reactive molecule includes a siloxane group, a fluorinated group a hydroxyl group 23. The process of any of paragraphs 1 through 20, wherein the cured 3D printed part is washed with a solvent to remove oil and/or unreacted reactive molecules from the surface of the cured 3D printed part.

Clause 1. According to the present disclose a process to cure and/or modify a three dimensional (3D) printed part may comprise the steps: providing a three dimensional printed part containing reactive moieties, and immersing the three dimensional (3D) printed part containing reactive moieties into a liquid bath to effect polymerization of the reactive moieties and change the degree of polymerization of the 3D printed part.

Clause 2. The process according to any preceding clause, wherein providing the 3D printed part includes washing the 3D printed part with a solvent.

Clause 3. The process according to any preceding clause, wherein the liquid bath has a temperature within the range of about 30° C. to about 300° C. and immersing include subjecting the 3D printed part to the liquid bath for a period within the range of about 1 minute to about 24 hours.

Clause 4. The process according to any preceding clause, wherein the liquid bath is a poor solvent having passed the polymer/solvent theta point for causing polymeric collapse.

Clause 5. The process according to any preceding clause, wherein immersing includes changing the temperature of the liquid bath between a first temperature and a second temperature.

Clause 6. The process according to any preceding clause, wherein the second temperature of the liquid bath is greater than the first temperature and is less than the heat deflection temperature of the 3D printed part.

Clause 7. The process according to any preceding clause, wherein the 3D printed part is within the liquid bath during changing of the temperature of the liquid bath between the first and second temperatures.

Clause 8. The process according to any preceding clause, wherein changing the temperature of the liquid bath between the first and second temperature includes at least one period of linear change.

Clause 9. The process according to any preceding clause, wherein changing the temperature of the liquid bath between the first and second temperature includes at least one period of non-linear change.

Clause 10. The process according to any preceding clause, wherein changing the temperature of the liquid bath between a first temperature and a second temperature includes at least one step-wise period providing no change in temperature.

Clause 11. The process according to any preceding clause, wherein the 3D printed part with reactive moieties is formed from a thermo-set or a photo-set resin comprising an acrylic resin, a methacrylic resin, a silicone resin, a fluororesin, a styrene resin, a polyolefin resin, a thermoplastic elastomer, a polyoxyalkylene resin, a polyester resin, a polyvinyl chloride resin, a polycarbonate resin, a polyphenylene sulfide resin, a cellulose resin, a polyacetal resin, a melamine resin, a polyurethane resin or a polyamide resin.

Clause 12. The process according to any preceding clause, wherein the reactive moieties include one or more cross-linking reactive moieties selected from the group consisting of acrylate, methacrylate, olefin, dithiol, diol, methoxysilane, ethoxysilane, and sulfide.

Clause 13. The process according to any preceding clause, wherein the liquid bath is a silicone oil bath, an aqueous glycol bath, a fluorinated polyether bath, an aqueous DMSO bath, or a DMSO bath.

Clause 14. The process according to any preceding clause, wherein the 3D printed part includes at least one of a UV stabilizer and a UV blocker.

Clause 15. The process according to any preceding clause, wherein a thermal initiator is present in and/or on the three dimensional printed part containing reactive moieties.

Clause 16. The process according to any preceding clause, wherein the thermal initiator has an activation temperature with the range of about 50 to about 140 C.

Clause 17. The process according to any preceding clause, wherein immersing includes changing the temperature of the liquid bath between a first temperature and a second temperature, wherein the second temperature of the liquid bath is greater than the first temperature and is less than the heat deflection temperature of the 3D printed part, and the activation temperature of the initiator is within the first and second temperatures.

Clause 18. The process according to any preceding clause, further comprising adding a reactive molecule to the liquid bath to react with the three dimensional (3D) printed part.

Clause 19. The process according to any preceding clause, wherein adding the reactive molecule to the liquid bath includes adding the reactive molecule to react with the surface of the three dimensional (3D) printed part.

Clause 20. The process according to any preceding clause, wherein the reactive molecule is an acrylate, methacrylate, vinyl containing group, olefin, or a thiol containing group.

Clause 21. The process according to any preceding clause, wherein the reactive molecule includes a siloxane group, a fluorinated group a hydroxyl group.

Clause 22. The process according to any preceding clause, wherein providing includes providing the three dimensional printed part having a cure percentage within the range of about 20% to about 80%.

Clause 23. The process according to any preceding clause, further comprising subjecting the three dimensional printed part to UV light treatment during a period including at least one of prior to immersing, during immersing, and after immersing.

The disclosure will be further described with reference to the following non-limiting Examples. It will be apparent to those skilled in the art that many changes can be made in the embodiments described without departing from the scope of the present disclosure. Thus the scope of the present disclosure should not be limited to the embodiments described in this application, but only by embodiments described by the language of the claims and the equivalents of those embodiments. Unless otherwise indicated, all percentages are by weight.

EXAMPLES

3D Printing Resin:
Example Basic 3D Printing Resin Formulation

Photo-Initiator, IGM Resin Omnirad 819 (Phenylbis(2,4,6-trimethylbenzyl)phosphine oxide, CAS 162881-26-7) or BASF TPO (Diphenyl(2,4,6-trimethylbenzoyl)phosphine oxide, CAS 75980-60-8). Weight % of the initiator ranged from 0.05% to 5% was used.

Reactive Diluent, 1,6-Hexanediol diacrylate (HDDA) monomer diluent with a weight % ranging from 20% to 80% was used.

Reactive Oligomer, BOMAR™ BR-970BT (a proprietary polyurethane difunctional acrylate available from Dymax Corporation) with a weight % ranging from 20% to 80% was used.

Thermal-Initiator, benzyl peroxide (60° C. to 80° C. thermal decomposition/initiation) or N-tert-butyl-benzothiazole sulfonamide (~120° C. thermal decomposition/initiation) with a weight % of from 0.05% to 5% was used.

3D Object Design, Slicing, Video Preparation, and UV Projection

3D STL objects were designed in Blender, an open source CAD rendering software geared towards graphic arts and video processing. These objects were then transferred into Autodesk Netfabb, in which support structures (as needed) could be applied. Netfabb was used to slice the STL objects and accompanying supports into 10 μm layer JPEG images with lateral resolutions corresponding to the UV projection source. Once an image stack was generated, the images were loaded back into Blender and compiled into AVI video files playing at 12 frames per second (12fps×10 μm/frame=120 μm/sec video). Once compiled, these videos could be played via standard video codecs and media players, such as VLC media player. Additionally, the frame rate of said videos could be advanced or slowed within these media players (allowing the user to run the video at a 30, 60 or 240 μm/sec rate). The videos were projected through a series of DLP (Digital Light Processing) projectors modified to project UV light. Lamp sources varied between different printers; some projection systems utilized medium pressure Hg lamps while others used monochromatic UV LEDs. The projectors were stitched together to create a continuous large projection field of view (maximum projection field of view was 15"×24" at 240 μm pixel resolution).

Printing Procedure

Resin was poured into the print vat. The print stage, held by a ball-screw actuator arm, was then brought into contact with the print interface. A 30 second UV exposure time was used to generate the initial adhesive layer of resin onto the steel build platform, and then the video was started in conjunction with the retraction of the build platform at 120 μm/sec. While print speeds of 240 μm/sec could be achieved, the quality of such prints and the reliability of the print process dropped substantially.

Traditional Light Cure: 3D printed parts were placed in a cure box lined with highly reflective materials and a UV cure lamp (high intensity LEDs or mercury lamp; wavelengths from 350 nm to 450 nm) for a period ranging from 8-48 hours. The sealed box results in both the accumulation of heat, reaching temperatures of about 50° C., and a high intensity of UV light colliding with the part from all directions. This serves two purposes—the light initiates further decomposition of photo-initiators not consumed during the 3D printing process while the heat generated from the lamp system helps to accelerate the resultant reactions. Thicker/ larger parts tend to have issues owing to the limited light penetration into the interior of the part.

Rapid Cure in Silicone Oil: 3D printed parts were immersed in a silicone oil (100 cSt oil) bath which was slowly heated to a cure temperature ranging from 50° C. to 150° C. The 3D printed parts were incubated from between 30 minutes to an hour, before being cooled and removed from the bath. The incubation temperature was selected based upon the 3D printed material's heat deflection temperature, and the decomposition/initiation temperature of the thermally activated radical initiator or catalyst (if one is present) to further drive the polymerization reaction within the solidified part. The surface tack of the part was substantially decreased, while 'fired' (cured) mechanical properties of the part were vastly superior to the 'green' (partially cured) part due to full conversion of the reactions.

There was washing before and after in the case of the oil bath examples. The first wash was in methanol to remove excess resin from the print process. After the majority of this resin was removed, the part was subjected to the liquid (oil) bath. After the part was removed from the oil bath, the oil was removed. Removal of silicon oil was fairly straight forward with warm water and dish detergent; this will not always be the same as it will depend upon what liquid is used in the heated bath that needs to be removed.

Rapid Cure in Silicone Oil with Silicone Finish: To apply a slick, low tack surface finish to the part, a silicone acrylate was dispersed in the silicone oil phase at 1% by weight to form a self-assembled monolayer (SAM) on the 3D printed part. Exemplary monomers included monomethacryloxypropyl terminated poly(dimethylsiloxane) (GELEST MCR-M07) and monomethacryloxypropyl functional tris[poly(dimethylsiloxane)] (GELEST MCT-M11). Other siloxane molecules with a reactive functional group can be used—the core principle being that there exists a reactive group which can be initiated by a radical propagation (acrylate, methacrylate, vinyl, olefin, thiol/mercaptan, etc.) in conjunction with a group which gives a desired surface finish. As the silicone acrylate is dispersed in the bulk silicone phase, there is no radical present to cause polymerization of the monomeric components. Only when these monomeric reactive molecule units come into contact with the reactive radicals present at the surface of the 3D printed part do they react to form a monolayer. The result is that the silicone bath containing 1% monomer can be continuously thermally cycled (coating multiple rounds of parts) without depleting/reacting the monomers dispersed within.

Rapid Cure in Silicone Oil with Fluorinated Finish: This procedure follows that for the silicone finish discussed above. In this scenario a 1% by weight monomethacryloxypropyl terminated poly (3,3,3-trifluoropropyl)methylsiloxane (GELEST MFR-M15) was dispersed in the silicone oil phase. When the molecule coated the 3D printed part, it left a thin fluorinated phase on the outer surface. This both reduced the tack of the part and made it quite slippery. Additionally, the fluorinated phase adds a layer of chemical protection and resistance from oxidizing chemicals. This is useful when one wants to make a 3D printed part chemically resistant to reaction (e.g. a tube carrying corrosive oxygen gas, a gas mask exposed to mustard gas, a part in contact with a strong acid or base). The layer provides protection in two ways—first, it is essentially non-reactive with most agents it could be exposed to and secondly, it creates a fluorinated phase in which most agents will not pass through to reach the more vulnerable inner material.

Although the present disclosure has been described with reference to preferred embodiments, persons skilled in the art will recognize that changes may be made in form and detail without departing from the spirit and scope of the disclosure. All references cited throughout the specification, including those in the background, are incorporated herein in their entirety. Those skilled in the art will recognize, or be able to ascertain, using no more than routine experimentation, many equivalents to specific embodiments of the disclosure described specifically herein. Such equivalents are intended to be encompassed in the scope of the following claims.

What is claimed is:

1. A process to cure and/or modify a three dimensional (3D) printed part comprising the steps:
   providing a three dimensional printed part containing reactive moieties, and comprising a thermal initiator disposed within the three dimensional printed part, and
   immersing the three dimensional (3D) printed part containing reactive moieties into a liquid bath to effect polymerization of the reactive moieties and change the degree of polymerization of the 3D printed part.

2. The process of claim 1, wherein providing the 3D printed part includes washing the 3D printed part with a solvent.

3. The process of claim 1, wherein the liquid bath has a temperature within the range of about 30° C. to about 300° C. and immersing includes subjecting the 3D printed part to the liquid bath for a period within the range of about 1 minute to about 24 hours.

4. The process of claim 1, wherein the liquid bath is a poor solvent having passed the polymer/solvent theta point for causing polymeric collapse.

5. The process of claim 1, wherein immersing includes changing the temperature of the liquid bath between a first temperature and a second temperature.

6. The process of claim 5, wherein the second temperature of the liquid bath is greater than the first temperature and is less than the heat deflection temperature of the 3D printed part.

7. The process of claim 5, wherein the 3D printed part is within the liquid bath during changing of the temperature of the liquid bath between the first and second temperatures.

8. The process of claim 5, wherein changing the temperature of the liquid bath between the first and second temperature includes at least one period of linear change.

9. The process of claim 5, wherein changing the temperature of the liquid bath between the first and second temperature includes at least one period of non-linear change.

10. The process of claim 5, wherein changing the temperature of the liquid bath between a first temperature and a second temperature includes at least one step-wise period providing no change in temperature.

11. The process of claim 1, wherein the 3D printed part with reactive moieties is formed from a thermo-set or a photo-set resin comprising an acrylic resin, a methacrylic resin, a silicone resin, a fluororesin, a styrene resin, a polyolefin resin, a thermoplastic elastomer, a polyoxyalkylene resin, a polyester resin, a polyvinyl chloride resin, a polycarbonate resin, a polyphenylene sulfide resin, a cellulose resin, a polyacetal resin, a melamine resin, a polyurethane resin, or a polyamide resin.

12. The process of claim 1, wherein the reactive moieties include one or more crosslinking reactive moieties selected from the group consisting of acrylate, methacrylate, olefin, dithiol, diol, methoxysilane, ethoxysilane, and sulfide.

13. The process of claim 1, wherein the liquid bath is a silicone oil bath, an aqueous glycol bath, a fluorinated polyether bath, an aqueous DMSO bath, or a DMSO bath.

14. The process of claim 1, wherein the 3D printed part includes at least one of a UV stabilizer and a UV blocker.

15. The process of claim 1, wherein the thermal initiator has an activation temperature with the range of about 50 to about 140 C.

16. The process of claim 1, wherein immersing includes changing the temperature of the liquid bath between a first temperature and a second temperature, wherein the second temperature of the liquid bath is greater than the first temperature and is less than the heat deflection temperature of the 3D printed part, and the activation temperature of the initiator is within the first and second temperatures.

17. The process of claim 1, further comprising adding a reactive molecule to the liquid bath to react with the three dimensional (3D) printed part.

18. The process of claim 17, wherein adding the reactive molecule to the liquid bath includes adding the reactive molecule to react with the surface of the 3D printed part.

19. The process of claim 17, wherein the reactive molecule is an acrylate, methacrylate, vinyl containing group, olefin, or a thiol containing group.

20. The process of claim 17, wherein the reactive molecule includes a siloxane group, a fluorinated group, or a hydroxyl group.

21. The process of claim 1, wherein providing includes providing the three dimensional printed part having a cure percentage within the range of about 20% to about 80%.

22. The process of claim 1, further comprising subjecting the three dimensional printed part to UV light treatment during a period including at least one of prior to immersing, during immersing, and after immersing.

23. The process of claim 1, wherein the 3D printed part comprising the thermal initiator includes the thermal initiator disposed within a bulk of the 3D printed part.

24. The process of claim 1, wherein the 3D printed part comprising the thermal initiator includes the thermal initiator disposed on the surface of the 3D printed part.

* * * * *